(12) United States Patent
Jang

(10) Patent No.: US 9,925,860 B2
(45) Date of Patent: Mar. 27, 2018

(54) SYSTEM FOR COOLING ENGINE OF MILD HYBRID VEHICLE AND METHOD FOR COOLING ENGINE OF MILD HYBRID VEHICLE

(71) Applicant: HYUNDAI MOTOR COMPANY, Seoul (KR)

(72) Inventor: Hwayong Jang, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 34 days.

(21) Appl. No.: 14/955,897

(22) Filed: Dec. 1, 2015

(65) Prior Publication Data

US 2017/0082012 A1 Mar. 23, 2017

(30) Foreign Application Priority Data

Sep. 18, 2015 (KR) .......................... 10-2015-0132433

(51) Int. Cl.
*F01P 7/14* (2006.01)
*B60K 11/02* (2006.01)
(Continued)

(52) U.S. Cl.
CPC ................ *B60K 11/02* (2013.01); *B60K 6/26* (2013.01); *F01P 7/167* (2013.01);
(Continued)

(58) Field of Classification Search
CPC ........ B60H 1/00778; F02G 5/04; F01P 11/02; F01P 2050/24; F02N 19/10;
(Continued)

(56) References Cited

U.S. PATENT DOCUMENTS 4,669,427 A * 6/1987 Shimonosono ....... F01P 3/2285
123/41.27
4,721,071 A * 1/1988 Fujigaya ................... F01P 3/20
123/41.21
(Continued)

FOREIGN PATENT DOCUMENTS

JP 2004-040933 A 2/2004
JP 2004-084580 A 3/2004
(Continued)

*Primary Examiner* — Long T Tran
(74) *Attorney, Agent, or Firm* — McDermott Will & Emery LLP

(57) ABSTRACT

A system for cooling an engine of a mild hybrid vehicle includes an engine that includes a plurality of combustion chambers generating driving torque by combustion of a fuel, an integrated starter-generator, a clutch that selectively transmits the driving torque to a transmission, a driving information detector that detects driving information of the vehicle, a cooling line through which a coolant for cooling the combustion chamber flows, a heat storage tank disposed at the cooling line, and that temporarily stores the coolant, and a controller that controls an inflow coolant amount flowing in the heat storage tank and an exhaust coolant amount exhausting from the heat storage tank depending on the driving information of the vehicle detected by the driving information detector.

5 Claims, 4 Drawing Sheets

(51) Int. Cl.
*B60K 6/26* (2007.10)
*F01P 7/16* (2006.01)
*F01P 11/20* (2006.01)

(52) U.S. Cl.
CPC ... *B60K 2006/268* (2013.01); *F01P 2007/146* (2013.01); *F01P 2011/205* (2013.01); *F01P 2050/24* (2013.01)

(58) Field of Classification Search
CPC ...... F02N 11/0803; F02N 11/04; F02N 11/14; F02N 15/022; F02M 31/20
See application file for complete search history.

(56) References Cited

U.S. PATENT DOCUMENTS

| | | | | |
|---|---|---|---|---|
| 2011/0276210 | A1* | 11/2011 | Tanaka | B60K 6/40 701/22 |
| 2013/0192272 | A1* | 8/2013 | Ranalli | F25B 21/04 62/3.3 |
| 2013/0297191 | A1* | 11/2013 | Gibson | F02N 11/0855 701/112 |
| 2015/0089943 | A1* | 4/2015 | Hussain | F01N 5/02 60/615 |

FOREIGN PATENT DOCUMENTS

| | | |
|---|---|---|
| JP | 2008-128037 A | 6/2008 |
| JP | 2012-091696 A | 5/2012 |
| KR | 10-0394642 B1 | 8/2003 |
| KR | 10-1518958 B1 | 5/2015 |

\* cited by examiner

SYSTEM FOR COOLING ENGINE OF MILD HYBRID VEHICLE AND METHOD FOR COOLING ENGINE OF MILD HYBRID VEHICLE

CROSS-REFERENCE TO RELATED APPLICATION

This application claims the benefit of priority to Korean Patent Application No. 10-2015-0132433, filed with the Korean Intellectual Property Office on Sep. 18, 2015, the entire contents of which are incorporated herein by reference.

TECHNICAL FIELD

The present disclosure relates to a system and a method for cooling an engine of a mild hybrid vehicle. More particularly, the present disclosure relates to a system and a method for cooling an engine of a mild hybrid vehicle that can ensure combustion stability of an engine by constantly maintaining a temperature of a combustion chamber using a heat storage tank when a vehicle is coasting.

BACKGROUND

Due to the needs for enhancing fuel efficiency of vehicles and satisfying stricter exhaust gas regulations, various environmentally-friendly vehicles are being developed.

A mild hybrid vehicle is mounted with an ISG (integrated starter and generator) in order to start an engine and support driving power, and either a DCT (Double Clutch Transmission) or an AMT (Automated Manual Transmission) is applied as a transmission.

General mild hybrid vehicles minimize fuel consumption by stopping operation of the engine and releasing engagement of the transmission when the vehicle is coasting.

However, since fuel is not injected into the engine while the mild hybrid vehicle is coasting, temperature of a combustion chamber may decrease. When the engine of the vehicle is operated after a temperature of the combustion chamber is decreased, since the temperature of the combustion chamber is low, it is difficult to ensure combustion stability.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a system and a method for cooling an engine of a mild hybrid vehicle that can ensure combustion stability by maintaining temperature of a combustion chamber when an engine is operated after mild hybrid vehicle coasting.

A system for cooling an engine of a mild hybrid vehicle according to an exemplary embodiment of the present disclosure may include: an engine that includes a plurality of combustion chambers generating driving torque by combustion of fuel; an integrated starter-generator that starts the engine and generates electrical energy by selectively operating as a power generator with the engine in operation; a clutch that selectively transmits the driving torque of the engine to a transmission; a driving information detector that detects driving information of a vehicle; a cooling line through which coolant for cooling the combustion chamber flows; a heat storage tank that is disposed at the cooling line and temporarily stores the coolant; and a controller that controls an inflow coolant amount flowing in the heat storage tank and an exhaust coolant amount exhausting from the heat storage tank depending on driving information of the vehicle detected by the driving information detector.

The system may further include: an inlet valve that adjusts the inflow coolant amount flowing in the heat storage tank; and an outlet valve that adjusts the exhaust coolant amount exhausting from the heat storage tank, wherein the controller controls opening of the inlet valve and the outlet valve.

The controller may store coolant in the heat storage tank by opening the inlet valve and closing the outlet valve when temperature of coolant flowing in the cooling line is a reference temperature or more.

The controller may supply coolant stored in the heat storage tank to the engine while cutting off fuel injected into the combustion chamber, releasing the clutch, and opening the outlet valve when it is determined that the vehicle is coasting from the driving information detected by the driving information detector.

The controller may adjust a coolant amount supplied from the heat storage tank to the engine step-by-step depending on coasting time.

A method for cooling an engine of a mild hybrid vehicle according to another exemplary embodiment of the present disclosure may include: determining whether an engine is operated; comparing temperature of coolant cooling the engine to a reference temperature; and temporarily storing part of coolant in a heat storage tank when the coolant temperature is greater than the reference temperature.

The method may further include determining whether a vehicle is coasting, and supplying coolant temporarily stored in the heat storage tank to the engine when the vehicle is coasting.

The method may further include adjusting a coolant amount supplied from the heat storage tank to the engine step-by-step depending on coasting time.

According to an exemplary embodiment of the present disclosure, since a heat storage tank that temporarily stores coolant for cooling an engine is disposed at a cooling line flowing the coolant, it is possible to constantly maintain temperature of a combustion chamber.

Further, since a coolant amount exhausted from the heat storage tank is adjusted depending on coasting time, it is possible to exactly maintain temperature of a combustion chamber.

In addition, since the temperature of a combustion chamber is constantly maintained, it is possible to ensure combustion stability when the engine is operated after the vehicle is coasting.

BRIEF DESCRIPTION OF THE DRAWINGS

The drawings are for reference in describing an exemplary embodiment of the present disclosure, so it shall not be construed that the technical spirit of the present disclosure is limited to the accompanying drawings.

DETAILED DESCRIPTION

Figure 1:
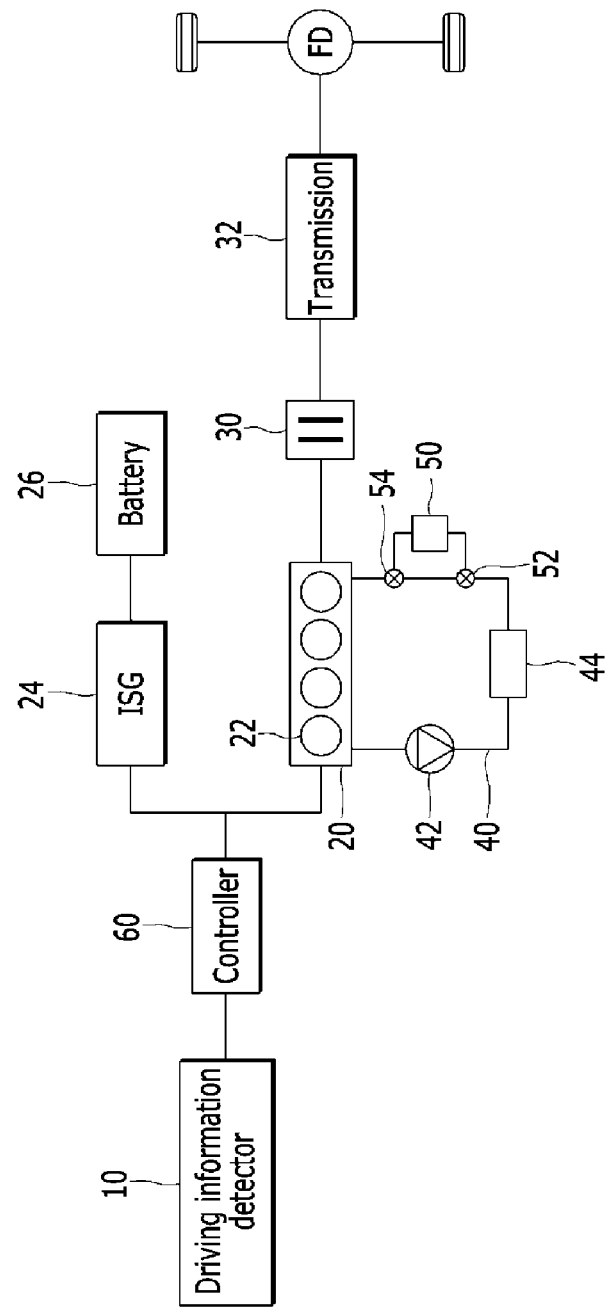
FIG. 1 is a schematic view illustrating a cooling system of a mild hybrid vehicle according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Parts unrelated to the description of the exemplary embodiments are not shown to make the description clear, and like reference numerals designate like elements throughout the specification.

The sizes and thicknesses of configurations shown in the drawings are selectively provided for convenience of description, such that the present disclosure is not limited to those shown in the drawings, and the thicknesses are exaggerated to make some parts and regions clear.

Hereinafter, a system for cooling an engine of a mild hybrid vehicle according to an exemplary embodiment of the present disclosure will be described in detail with reference to the accompanying drawings.

Figure 2:
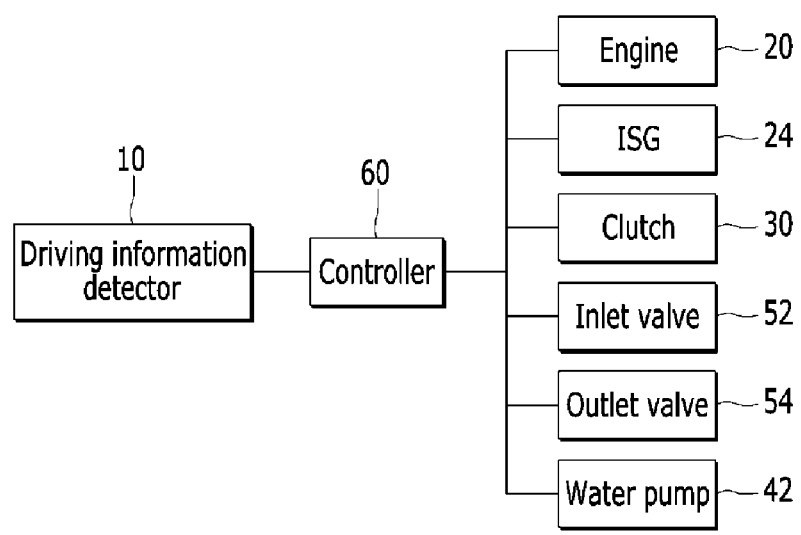
FIG. 2 is a block diagram illustrating a cooling system of a mild hybrid vehicle according to an exemplary embodiment of the present disclosure.

FIG. 1 is a schematic view illustrating a cooling system of a mild hybrid vehicle according to an exemplary embodiment of the present disclosure. FIG. 2 is a block diagram illustrating a cooling system of a mild hybrid vehicle according to an exemplary embodiment of the present disclosure.

As shown in FIG. 1 and in FIG. 2, a system for cooling an engine of a mild hybrid vehicle according to an exemplary embodiment of the present disclosure may include an engine 20, an integrated starter-generator 24, a clutch 30 transmitting driving torque of the engine 20 to driving wheels through a transmission 32, a driving information detector 10 detecting driving information of a vehicle, a cooling system cooling the engine 20, and a controller 60 controlling the engine 20, the integrated starter-generator 24, the clutch 30, and the cooling system depending on the driving information detected by the driving information detector 10.

A plurality of combustion chambers 22 are disposed in the engine 20, and driving torque such that the vehicle can travel is generated by combustion of fuel flowing into the combustion chamber 22.

The integrated starter-generator 24 is disposed at the engine 20, and the integrated starter-generator 24 starts the engine 20 and generates electrical energy by selectively operating as a generator with the engine in operation. The electrical energy generated by the integrated starter-generator 24 is stored in a battery 26. The integrated starter-generator 24 may be called an HSG (hybrid starter and generator) or an ISG (integrated starter and generator).

The cooling system may include a cooling line 40 through which coolant for cooling the engine 20 flows, a water pump 42 that recirculates the coolant flowing the cooling line 40, a radiator 44 that cools the coolant flowing through the cooling line 40, and a heat storage tank 50 that is disposed at the cooling line 40 and temporarily stores the coolant.

An inlet valve 52 for adjusting an inflow coolant amount flowing in the heat storage tank 50 and an outlet valve 54 for adjusting an exhaust coolant amount exhausting from the heat storage tank are disposed at the heat storage tank 50. The controller 60 controls a coolant amount stored in the heat storage tank 50 by controlling an opening of the inlet valve 52 and the outlet valve 54.

The driving information detector 10 detects the driving information of the vehicle, and the driving information is transmitted to the controller 60. For example, the driving information detector 10 may include a brake pedal sensor (BPS), a clutch pedal sensor, an accelerator pedal sensor (APS), a vehicle speed sensor, a slope sensor, and a coolant temperature sensor.

It can be determined whether the engine 20 is operated, whether the vehicle is accelerated or decelerated, or whether the vehicle is coasting by the driving information detector 10.

The controller 60 may be implemented by one or more processors operated by a predetermined program, in which the predetermined program is set to perform steps of the method for cooling the engine of the mild hybrid vehicle according to an exemplary embodiment of the present disclosure.

The controller 60 controls the engine 20, the integrated starter-generator 24, and the cooling system based on the driving information detected by the driving information detector 10.

In detail, when the engine 20 is operated and the coolant temperature is a reference temperature or more based on the driving information detected by the driving information detector 10, the controller 60 stores the coolant in the heat storage tank 50 by opening the inlet valve 52 and closing the outlet valve 54.

Figure 3:
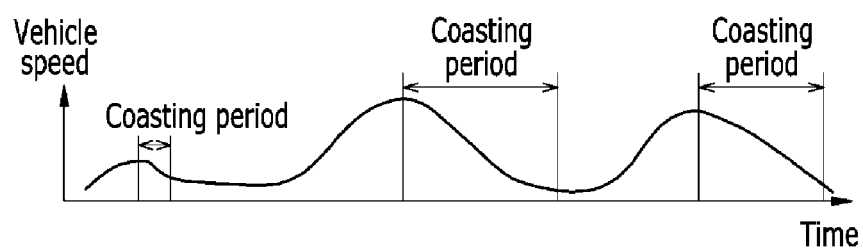
FIG. 3 is a graph illustrating a running section of a mild hybrid vehicle according to an exemplary embodiment of the present disclosure.

The controller 60 determines whether the vehicle is coasting based on the driving information detected by the driving information detector 10. The controller 60 may determine that the vehicle is coasting if an APS signal is not detected, and a BPS signal or a clutch pedal signal is not detected. Further, the controller 60 may determine that the vehicle is coasting if the vehicle runs on a downhill road. The controller 60 may also determine that the vehicle is coasting if a vehicle speed is not increased and the vehicle speed is constantly decreased (refer to FIG. 3).

When the vehicle is coasting, the controller 60 may stop the operation of the engine 20 by cutting off fuel injected into the combustion chamber 22 and releases the clutch 30. The controller 60 may also supply the coolant stored in the heat storage tank 50 to the engine 20 by closing the inlet valve 52 and opening the outlet valve 54.

At this time, the inflow coolant amount supplied from the heat storage tank 50 to the engine 20 is adjusted step-by-step depending on coasting time of the vehicle. The coasting time may be determined from a time that the operation of the engine 20 is stopped and the clutch 30 is released to a time that the operation of the engine 20 is started and the clutch 30 is engaged.

For example, the controller 60 supplies a first coolant amount to the engine 20 if the coasting time is less than a first predetermined time. The controller 60 supplies a second coolant amount to the engine 20 if the coasting time is greater than the first predetermined time and less than a second predetermined time. The controller 60 supplies a third coolant amount to the engine 20 if the coasting time is greater than the second predetermined time and less than a third predetermined time. The controller 60 supplies a fourth coolant amount to the engine 20 if the coasting time is greater than the third predetermined time.

The third predetermined time is longer than the second predetermined time, and the second predetermined time is longer than the first predetermined time. The fourth coolant amount is larger than the third coolant amount, the third coolant amount is larger than the second coolant amount, and the second coolant amount is larger than the first coolant amount.

As such, since the inflow coolant amount is adjusted step-by-step from the heat storage tank 50 to the engine 20 depending on the coasting time, it may be possible to exactly maintain a temperature of the combustion chamber 22.

Hereinafter, a method for cooling an engine of a mild hybrid vehicle according to an exemplary embodiment of the present disclosure will be described in detail with reference to the accompanying drawings.

Figure 4:
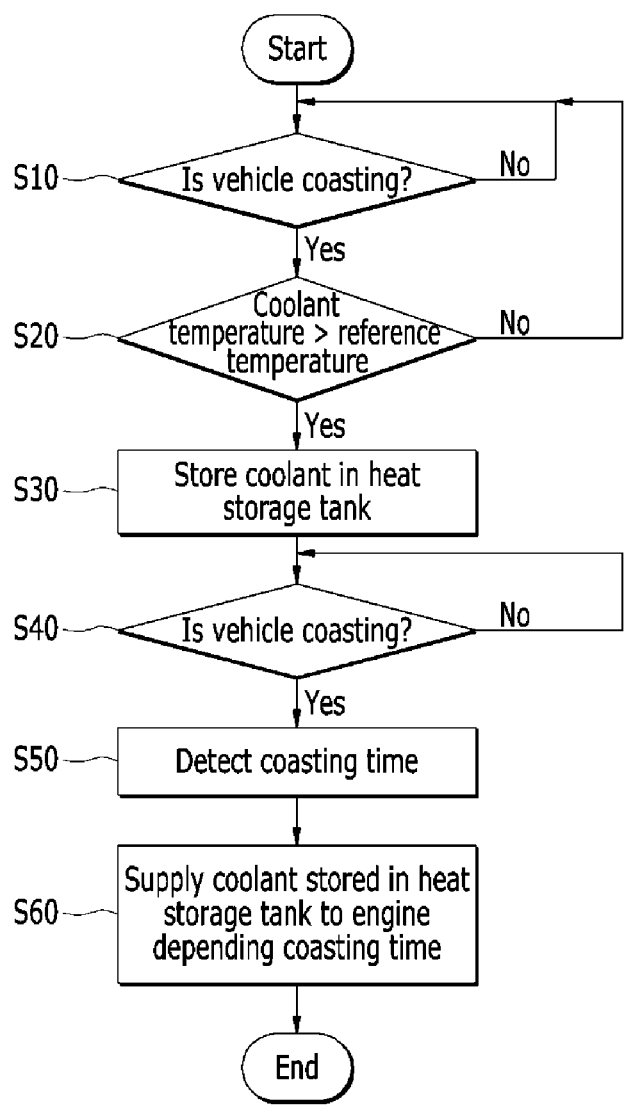
FIG. 4 is a flowchart illustrating a cooling method of a mild hybrid vehicle according to an exemplary embodiment of the present disclosure.

FIG. 4 is a flowchart illustrating a cooling method of a mild hybrid vehicle according to an exemplary embodiment of the present disclosure.

The controller 60 may determine whether the engine 20 is operated based on the driving information detected by the driving information detector 10 at step S10.

The controller 60 may compare coolant temperature to a reference temperature at step S20.

If the engine is operated and the coolant temperature is greater than the reference temperature, the controller 60 may temporarily store the coolant having a high temperature and cool the engine 20 at step S30. At this time, the controller 60 stores the coolant by opening the inlet valve 52 and closing the outlet valve 54.

The controller 60 may determine whether the vehicle is coasting based on the driving information detected by the driving information detector 10 at step S40.

If the vehicle is coasting, the controller 60 may supply the coolant being stored in the heat storage tank 50 and having a relatively high temperature to the engine 20 by closing the inlet valve 52 and opening the outlet valve 54. If the coolant having a relatively high temperature is supplied to the engine 20, it is possible to increase the temperature of the combustion chamber 22 that has been lowered by stopping the operation of the engine 20 while coasting.

The controller 60 calculates a coasting time of the vehicle based on the driving information detected by the driving information detector 10 at step S50.

The controller 60 may adjust the inflow coolant amount supplied from the heat storage tank 50 to the engine 20 step-by-step depending on the coasting time at step S60. That is, as the coasting time is long, the controller 60 increases the inflow coolant amount supplied from the heat storage tank 50 to the engine 20. As such, since a large amount of the coolant having a relatively high temperature is supplied to the engine 20 as the coasting time is longer and a small amount of the coolant is supplied to the engine 20 as the coasting time is shorter, it may be possible to constantly maintain the temperature of the combustion chamber 22. Further, since the temperature of the combustion chamber 22 may be constantly maintained, combustion stability can be ensured when the engine 20 is operated after vehicle coasting.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system for cooling an engine of a mild hybrid vehicle, comprising:
   an engine that includes a plurality of combustion chambers generating driving torque by combustion of a fuel;
   an integrated starter-generator that starts the engine and generates electrical energy by selectively operating as a power generator with the engine in operation;
   a clutch that selectively transmits the driving torque to a transmission;
   a driving information detector that detects driving information of the vehicle;
   a cooling line through which a coolant for cooling the combustion chamber flows;
   a heat storage tank disposed at the cooling line, and that temporarily stores the coolant;
   a controller that controls an inflow coolant amount flowing in the heat storage tank and an exhaust coolant amount exhausting from the heat storage tank depending on the driving information of the vehicle detected by the driving information detector;
   an inlet valve that adjusts the inflow coolant amount flowing in the heat storage tank; and
   an outlet valve that adjusts the exhaust coolant amount exhausting from the heat storage tank,
   wherein the controller controls an opening of the inlet valve and the outlet valve, and
   the controller supplies coolant stored in the heat storage tank to the engine while cutting off fuel injected into the combustion chamber, releasing the clutch, and opening the outlet valve when it is determined that the vehicle is coasting from the driving information detected by the driving information detector.

2. The system of claim 1, wherein the controller stores coolant in the heat storage tank by opening the inlet valve and closing the outlet valve when temperature of coolant flowing in the cooling line is a reference temperature or more.

3. The system of claim 1, wherein the controller adjusts a coolant amount supplied from the heat storage tank to the engine step-by-step depending on a coasting time.

4. A method for cooling an engine of a mild hybrid vehicle, comprising:
   determining whether the engine is operated;
   comparing a temperature of a coolant cooling the engine to a reference temperature;
   opening an inlet valve that adjusts an inflow coolant amount flowing in the heat storage tank and closing an outlet valve that adjusts an exhaust coolant amount exhausting from the heat storage tank when the engine is operated and the coolant temperature is greater than the reference temperature;
   determining whether a vehicle is coasting; and
   closing the inlet valve and opening the outlet valve when the vehicle is coasting.

5. The method of claim 4, further comprising
   adjusting a coolant amount supplied from the heat storage tank to the engine step-by-step depending on a coasting time.

* * * * *